Patented Oct. 1, 1940

2,216,284

UNITED STATES PATENT OFFICE 2,216,284

ISOMERIZATION OF NORMAL OLEFINS

Charles L. Thomas and Herman S. Bloch, Chicago, Ill., assignors to Universal Oil Products Company, Chicago, Ill., a corporation of Delaware No Drawing. Application February 9, 1939, Serial No. 255,477

8 Claims. (Cl. 260—683)

This invention relates to the isomerization of hydrocarbons and pertains more specifically to the catalytic isomerization of olefin hydrocarbons. By this process relatively straight chain olefinic hydrocarbons are converted into branched chain olefinic hydrocarbons or slightly branched chain olefins are converted into more branched chain olefins.

With the rapid rate of development of hydrocarbon technology, isomerization of hydrocarbons assumes important aspects. Frequently the normal olefins are more available than the iso-olefins and for some uses it becomes highly desirable to convert the normal into the iso-olefins. The present invention involves the conversion of olefinic hydrocarbons in the presence of specific types of catalytic materials which function to selectively isomerize normal olefinic hydrocarbons with the formation of large yields of iso-olefins under suitable conditions of operation. The preferred catalysts are prepared synthetically by definite steps of procedure which are specific in the production of catalysts of high activity for prolonged use. Many catalysts used in hydrocarbon reactions generally such as reduced metal catalysts, particularly iron and nickel, accelerate reactions leading to the formation of gas and these catalysts also have the disadvantage of being readily poisoned and quickly coated with carbonaceous material. Many metal oxide catalysts which are available accelerate principally dehydrogenation reactions. The preferred catalysts used in the present invention, however, are characterized by their selectivity in accelerating the desired isomerization reactions, by their ease and simplicity of manufacture, their exact reproducibility and their refractory nature which enables them to retain their catalytic properties over extended periods of time under high temperature conditions of use and regeneration.

In one specific embodiment the present invention comprises subjecting relatively straight chain normal olefinic hydrocarbons at elevated temperatures and at atmospheric to moderately superatmospheric pressures to contact with catalytic materials comprising synthetically prepared calcined composites of hydrated silica, hydrated alumina and hydrated thoria producing high yields of iso-olefinic hydrocarbons. In a further embodiment the catalytic materials comprise synthetically prepared composite masses of hydrated silica, hydrated alumina and hydrated zirconia.

In the description of the catalysts of the present invention they are referred to as silica-alumina-thoria or silica-alumina-zirconia catalysts since compounds represented by the symbols $SiO_2$, $Al_2O_3$, $ThO_2$ and $ZrO_2$ are involved. Inasmuch as the chemistry of the true solid state is very incompletely developed, it has not been determined how these materials are arranged within the catalyst. These catalysts may be prepared by a number of alternative methods which have certain necessary features in common as will be subsequently described. Generally speaking, however, the catalysts may be considered to comprise a combination of silicon, aluminum and thorium or silicon, aluminum and zirconium with oxygen, possibly an intimate molecular admixture of silica-alumina-thoria and silica-alumina-zirconia, all of the components of which indicate more or less low activity individually but in the aggregate display high activity. The activity is not an additive function, it being relatively constant for a wide range of proportions of the components whether in molecular or fractions of molecular proportions. No one component can be determined as the one component for which the remaining components may be considered as the promoters according to conventional terminology, nor can any component be determined as the support and the others the catalyst proper.

In the description of the preparation of the preferred catalysts given below precipitated hydrated alumina and hydrated zirconia may be composited with hydrated silica gel and salts of zirconium may be used instead of salts of thorium as when preparing silica-alumina-thoria catalysts although the catalysts produced therefrom do not necessarily give equivalent results. It has been found in some cases that the silica-alumina-zirconia composites have greater stability over prolonged periods of use than have some silica-alumina catalysts.

According to one general method of preparation used before drying treatment, the preferred catalysts may be prepared by precipitating silica from a solution as a gel and subsequently admixing or depositing the hydrated alumina and hydrated thoria upon the hydrated silica. One of the more convenient methods of preparing the silica gel is to acidify an aqueous solution of sodium silicate by the addition of an acid such as hydrochloric acid, for example. The excess acid and the concentration of the solution in which the precipitation is brought about determine in some measure the suitability of the silica hydrogel for subsequent compositing with hydrated alumina and hydrated thoria. In general, suitable hydrated silica may be produced by the use of dilute solutions of sodium silicate and the addition of a moderate excess of acid whereby the desired active silica gel is obtained and conditions of filtering and washing are at an optimum.

After precipitating the hydrated silica it is treated and washed to substantially remove alkali metal ions. It is not known whether the alkali metal ions such as sodium are present in the primary gel in chemical combination or in an adsorbed state but it has been definitely determined that their removal is necessary if catalysts suitable for prolonged use in accelerating isomerization reactions are to be obtained. It is possible that the presence of the alkali metal impurities causes a sintering or fluxing of the surfaces of the catalyst at elevated temperatures so that the porosity is much reduced with corresponding reduction in effective surface. Alkali metal ions may be removed by treating with solutions of acidic materials, ammonium salts generally, or salts of aluminum and thorium. When treating with acids, as for example, with hydrochloric acid, the acid extracts the alkali metal impurities in the silica gel. The salts formed and acid are then substantially removed by water washing treatment. Where ammonium salts or salts of aluminum and thorium are used, the ammonium or multivalent metals apparently displace the alkali metal impurities present in the composite and the alkali metal salts formed are removed in the water washing treatment. The multivalent metals introduced into the silica hydrogel in the purifying treatment become a permanent part of the composite, whereas, in the treatment with ammonium salts, the ammonium salt which is present in relatively small amount will be driven off in subsequent treatment at elevated temperatures.

In one of the preferred methods of compositing the hydrated materials, the purified precipitated hydrated silica gel may be suspended in a solution of thorium and aluminum salts in the desired proportions and hydrated thoria and hydrated alumina deposited upon the suspended hydrated silica by the addition of volatile basic precipitants such as ammonium hydroxide, for example, or ammonium carbonate, ammonium hydrosulfide, ammonium sulfide, or other volatile basic precipitants such as organic bases may be employed. According to this method, the purified silica gel may be suspended in a solution of thorium and aluminum chloride, for example, and the hydrated thoria and hydrated alumina precipitated by the addition of ammonium hydroxide. In this example, the hydrated alumina and hydrated thoria were co-precipitated. Good results may be obtained by depositing one of these components prior to the remaining component.

Alternatively the purified hydrated silica gel may be mixed while in the wet condition with separately prepared hydrated alumina and hydrated thoria precipitated either separately or concurrently by the addition of volatile basic precipitants to solutions of salts of aluminum and thorium. The hydrated alumina and hydrated thoria thus prepared are substantially free from alkali metal ions and can be admixed with the purified silica gel. However, if alkali metal ions are incorporated as when the hydrated alumina is prepared from sodium aluminate, for example, regulated treatment and water washing would be required by methods selected from those described in connection with the purification of the hydrated silica gel to remove alkali metal ions. Care should be observed in the selection and concentration of reagents used so as not to dissolve unduly large amounts of hydrated alumina or hydrated thoria. As further alternatives the purified silica gel may be added to a solution of salts of aluminum and thorium, and hydrated alumina and hydrated thoria deposited by hydrolysis with or without the use of heat, or the purified silica gel may be mixed with suitable amounts of salts of aluminum and thorium as, for example, in forming a paste and heating whereby alumina and thoria are deposited upon the silica gel as a result of the decomposition of the aluminum and thorium salts.

In the methods above described a silica hydrogel free from alkali metal ions was admixed or had deposited thereon relatively pure hydrated alumina and hydrated thoria prior to drying treatment. In methods described below the hydrated silica, hydrated alumina and hydrated thoria are concurrently precipitated or admixed and treated to remove alkali metal ions from the composited material prior to drying treatment either in presence of the original reactants or subsequent to water washing. Thus, solutions of silicon compounds more usually alkali metal silicates and soluble aluminum and thorium salts may be mixed under regulated conditions of acidity or basicity to jointly precipitate hydrated silica, hydrated alumina and hydrated thoria in varying proportions. For example, solutions of sodium silicate, aluminum chloride and thorium nitrate may be mixed and alkaline or acid reagents added according to the proportions used so that a pH of 3-10 is obtained. In cases where a sol is formed, the precipitation may be brought about if the sol is acid by addition of a volatile base as, for example, ammonium hydroxide and alkali metal salts removed by water washing, or the composite may be treated as indicated above in connection with the purification of the hydrated silica to remove alkali metal ions. Various methods are possible for the preparation of the hydrated silica, hydrated alumina and hydrated thoria separately or in combination and the purifying treatment is necessary where alkali metal ions are present in substantial amounts.

The character and efficiency of the ultimately prepared silica-alumina-thoria catalyst will vary more or less with precipitation and/or mixing, purification treatment, ratio of components, calcining etc., several specific examples being given. The ratio of the components may be varied within wide limits, the limiting factor with respect to activity being more in evidence with small proportions than with larger proportions of the various components. In general, it appears that two to six mole per cent of alumina and thoria together with reference to silica may be considered an approximation of the minimum proportions.

After the alumina and thoria have been mixed with or deposited upon the purified hydrated silica gel and water washed if desired, as described for one general method of preparation, or after the hydrated silica, hydrated alumina and hydrated thoria have been composited and treated to remove alkali metal ions, as described for another general method of preparation, the catalytic material may be recovered as a filter cake and dried at a temperature of the order of 240-300° F. more or less, after which it may be formed into particles of a suitable size ranging from powder to various formed sizes obtained by pressing and sizing or otherwise formed before or after drying into desired shapes by extrusion or compression methods for example.

By calcining at temperatures of the order of approximately 850-1000° F., or higher, maximum activity of the catalyst is obtained and a further dehydration occurs so that, for example, after a considerable period of heating at 900° F., the water content as determined by analysis is of the order of 2-3 per cent.

Catalysts prepared by the various types of procedures outlined evidently possess a large contact surface corresponding to a desirable porosity, the pores of the catalyst particles being of such size and shape that they do not become clogged with carbonaceous deposits after a long period of service, and therefore are not difficult to reactivate by oxidation. This structure is also retained after many alternate periods of use and reactivation as evidenced by the fact that the catalysts may be repeatedly reactivated by passing air, or other oxidizing gas, over the spent particles to burn off deposits of carbonaceous material at temperatures above 800° F., temperatures as high as 1400-1600° F. having been reached without apparently affecting the catalytic activity.

In accordance with the present invention the catalysts may be conveniently utilized in isomerizing hydrocarbons when employed as filling material in tubes or chambers in the form of small pellets or granules. The average particle size may be within the approximate range of 1-10 mesh, which may apply either to pellets of uniform size and short cylindrical shapes or to particles of irregular size and shape produced by the grinding, consolidating and sizing of the partially dehydrated materials. While the simple method of preheating the hydrocarbon vapors to a temperature suitable for their isomerization in contact with the catalysts and then passing the vapors over a stationary mass of catalyst particles may be employed in some cases, it may be preferable to pass the preheated vapors through or around a plurality of relatively small diameter tubes in multiple and parallel connection having catalyst disposed in or around said tubes since this arrangement of apparatus is better adapted to permit heating and cooling of the catalyst masses. After the passage of the hydrocarbon vapors over the catalysts, the products are separated by fractionation.

The temperatures employed in contact with the catalysts will vary according to the olefinic hydrocarbons charged to the process, the temperatures used, however, being within the range of 400 to 1050° F. When processing any particular fraction of these hydrocarbons shorter contact times are used for the higher temperature. Substantially atmospheric pressure or moderately superatmospheric pressures up to 90 pounds per square inch or more may be used such pressures being somewhat governed by flow conditions through the vaporizing and conversion zones and the subsequent separating, fractionating and collecting equipment.

The following specific examples are given to illustrate the process of the invention, the methods of catalyst preparation also being given. The process should not be considered as limited to these examples or to the particular catalyst preparations, these being given as illustrative of the novelty and utility of the invention.

A catalyst was prepared as follows, having hydrated silica, hydrated alumina and hydrated thoria in the following proportions:

$100SiO_2 : 5Al_2O_3 : 0.5ThO_2$

A solution of commercial sodium silicate was prepared corresponding to 480 grams of $SiO_2$ in 7 liters of water. To this was added slowly while agitating 1350 cc. of dilute hydrochloric acid solution (containing 562 cc. of concentrated acid). A silica hydrogel was formed which was directed to a filter and subsequently carefully water washed including a wash with dilute ammonium chloride solution, the washed silica gel being recovered as a filter cake. A portion of this cake corresponding to 84 grams of $SiO_2$ was slurried in a solution of 34 grams of aluminum chloride hexahydrate and 4 grams of thorium nitrate $Th(NO_3)_4 \cdot 4H_2O$ in 1500 cc. of water. Ammonium hydroxide was then added until the liquid was basic to red litmus paper whereby a mixed mass of hydrated alumina and hydrated thoria was precipitated in the presence of the suspended hydrated silica. The suspension was then directed to a filter and filter cake obtained which after drying at approximately 300° F. was powdered and consolidated. Granules of 6-10 mesh were prepared and calcined at approximately 900° F. prior to contacting with the hydrocarbon vapor.

When catalyst prepared as above is disposed in a chamber and 98% pure pentene-1 for example is vaporized and directed through the catalyst at approximately 750° F. and substantially atmospheric pressure using a liquid space velocity per hour of approximately 3, the product comprises 7% gas, 72% of $C_5$ fraction and 17% of higher boiling material. The $C_5$ fraction comprises 82% of isopentene corresponding to a 59% yield based on the pentene charged to the process.

As a further example, when vaporizing a mixture of 1 and 2 normal octenes and directing the vapors through the silica-alumina-thoria catalyst at approximately 725° F. and substantially atmospheric pressure using a liquid space velocity per hour of approximately 4, a yield of 61.0% by weight of the charge of iso-octenes was produced in a single pass, approximately 18% of the products being unconverted octene and approximately 14% being normally gaseous hydrocarbons.

Considerably lower and higher space velocities may be used in the process of the present invention which is not considered as limited in this respect, and various olefinic hydrocarbons or mixtures thereof with or without the presence of other hydrocarbons may be processed. Silica-alumina-zirconia catalysts as for example a catalyst of the following proportions—$100SiO_2 : 4Al_2O_3 : 2ZrO_2$ prepared similarly to the silica-alumina-thoria catalyst above described will produce similar yields of products under approximately the same operating conditions.

We claim as our invention:

1. A process for the isomerization of substantially straight chain olefinic hydrocarbons into large yields of branched chain olefinic hydrocarbons which comprises subjecting said hydrocarbons at a temperature within the range of 400-1050° F. and substantially atmospheric to moderately superatmospheric pressure to contact with catalytic material comprising essentially hydrated silica and hydrated alumina composited with a hydrated oxide selected from the group consisting of hydrated thoria and hydrated zirconia from which catalytic material alkali metal ions have been excluded.

2. A process for the isomerization of normal pentenes present in hydrocarbon fractions into large yields of isopentenes which comprises subjecting said hydrocarbons at a temperature within the range of 600–1000° F. and substantially atmospheric to moderately superatmospheric pressure to contact with catalytic material comprising essentially hydrated silica and hydrated alumina composited with a hydrated oxide selected from the group consisting of hydrated thoria and hydrated zirconia from which catalytic material alkali metal ions have been excluded.

3. A process for producing branched chain olefins from olefins containing a straight carbon chain which comprises subjecting the last-named olefins to isomerizing conditions in the presence of a calcined mixture of hydrated silica, hydrated alumina and an additional hydrated oxide selected from the group consisting of hydrated thoria and hydrated zirconia.

4. A process for producing branched chain olefins from olefins containing a straight carbon chain which comprises subjecting the last-named olefins to isomerizing conditions in the presence of a calcined mixture of hydrated silica, hydrated alumina and hydrated thoria.

5. A process for producing branched chain olefins from olefins containing a straight carbon chain which comprises subjecting the last-named olefins to isomerizing conditions in the presence of a calcined mixture of hydrated silica, hydrated alumina and hydrated zirconia.

6. A process for converting normal olefins into iso-olefins which comprises subjecting the normal olefins to isomerizing conditions in the presence of a calcined mixture of hydrated silica, hydrated alumina and an additional hydrated oxide selected from the group consisting of hydrated thoria and hydrated zirconia.

7. A process for converting normal olefins into iso-olefins which comprises subjecting the normal olefins to isomerizing conditions in the presence of a calcined mixture of hydrated silica, hydrated alumina and hydrated thoria.

8. A process for converting normal olefins into iso-olefins which comprises subjecting the normal olefins to isomerizing conditions in the presence of a calcined mixture of hydrated silica, hydrated alumina and hydrated zirconia.

CHARLES L. THOMAS.
HERMAN S. BLOCH.